(No Model.)

J. MEALEY.
BRIDLE BLINDER BUCKLE.

No. 588,590. Patented Aug. 24, 1897.

Witnesses;
C. E. Van Doren
Richard Paul

Inventor;
Johnston Mealey
By Van Do Hawley
his Attorneys.

THE NORRIS PETERS CO., PHOTO-LITHO., WASHINGTON, D. C.

UNITED STATES PATENT OFFICE.

JOHNSTON MEALEY, OF HOWARD LAKE, MINNESOTA.

BRIDLE BLINDER-BUCKLE.

SPECIFICATION forming part of Letters Patent No. 588,590, dated August 24, 1897.

Application filed November 28, 1896. Serial No. 613,742. (No model.)

*To all whom it may concern:*

Be it known that I, JOHNSTON MEALEY, of Howard Lake, Wright county, Minnesota, have invented certain new and useful Improvements in Bridle Blinder-Buckles, of which the following is a specification.

My invention relates to means for attaching blinders to bridles and also to an improved form of blinder.

The object of my invention is to provide a blinder-buckle by means of which the blinder may be secured to the cheek-strap without sewing, stitching, or riveting the same.

A further object is to provide a buckle that may be readily adjusted on the cheek-strap to adapt the buckle for use on harnesses of different sizes; and a still further object is to provide a light flexible blinder and means for preventing the same from shaking and flapping while in use.

To this end my invention consists in the combination of the cheek-strap with a buckle-frame through which said strap passes, said frame having cross-bars upon opposite sides of said strap, studs upon one or more of said bars to engage holes in said strap, and a blinder projecting laterally into said frame and engaging studs on the bar or bars thereof, the bars and studs of the frame being relied upon to secure the strap and blinder together; and, further, the invention consists in a brace or supporting-arm extending from the buckle-frame to the middle part of the blinder to more securely fasten the same and prevent its shaking or flapping before the horse's eyes.

The invention particularly consists in details of construction and in combinations, all as hereinafter described, and particularly pointed out in the claims.

The invention will be more readily understood by reference to the accompanying drawings, forming part of this specification, and in which—

Figure 1:
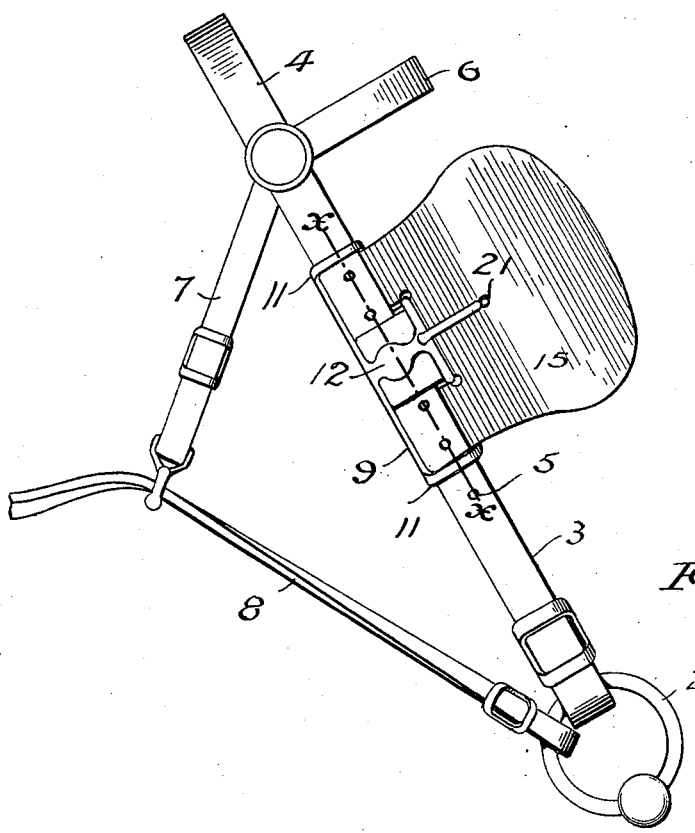
Figure 2:
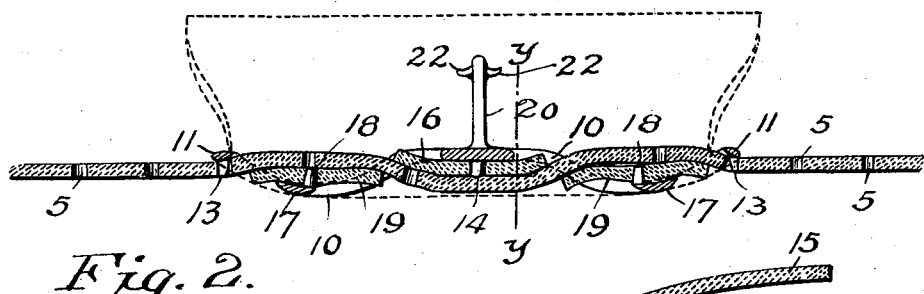
Figure 3:
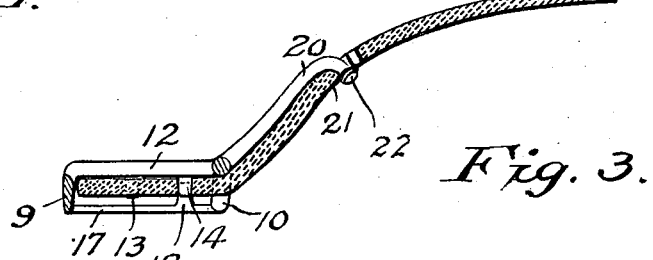

Figure 1 is a side view of a bridle provided with a blinder and buckle embodying my invention. Fig. 2 is an enlarged sectional view thereof on the line $x\ x$ of Fig. 1. Fig. 3 is a transverse sectional view on the line $y\ y$ of Fig. 2 with the cheek-strap removed.

In the drawings, 2 represents the bit-ring, and 3 the cheek-strap, having its lower end secured to the bit-ring and its opposite end connected to the crown-piece 4 of the bridle. The cheek-strap 3 is provided with a series of holes or openings 5 to permit the adjustment of the blinder-buckle thereon in any desired position.

6 is the brow-band, and 7 a short strap depending from the crown-piece and supporting the cheek-strap 3.

The blinder-buckle, through which passes the cheek-strap 3, comprises the side bars 9 and 10, having their upper edges connected by the end cross-bars 11, and the middle cross-bar 12. The bar 9, forming one side of the buckle-frame, is substantially straight, while the bar 10 curves downwardly upon either side of the middle cross-bar 12 for the purpose hereinafter described.

The end bars 11 are provided with the lugs or pins 13 to enter the openings 5, provided in the cheek-strap, whereby the buckle-frame may be adjusted in any desired position on the strap. The middle cross-bar 12 is also provided with a depending pin 14 to enter an opening provided in the middle portion 16 of the inner edge of the blinder 15, the edge of the blinder being cut or slit upon either side of the middle portion to permit the same to be inserted into the buckle-frame beneath the middle portion of the side bar 10. The lower edges of the side bars 9 and 10 are connected by the cross-bars 17, having upwardly-extending pins or lugs 18 to enter openings provided in the edge parts 19 of the blinder. These parts 19 pass over the downwardly-curved portions of the side bar 10 and beneath the cheek-strap 3, and the blinder is thereby firmly held in position in the buckle-frame. Upon the side bar 10, at the end of the cross-bar 12, I provide an inclined laterally-extending arm 20, having a downwardly-curved outer end to pass through an opening 21, provided in the blinder 15. Prongs 22 or an equivalent fastening is provided in the end of said arm 20, by means of which the blinder will be prevented from slipping off the end of the arm after it has been passed through the opening in the blinder. The opening 21 is in such a position in the blinder that when the end of the arm is passed through the opening the blinder will be curved out against the arm 20, so that the inside of the blinder presents a concave form and the blinder is removed from contact with the eye of the horse. The arm also prevents the flapping of the blinder.

Having thus described my invention, I claim as new and desire to secure by Letters Patent—

1. The combination, with the strap, of the blinder and the buckle comprising the frame inclosing the strap and parts of the blinder, said frame having cross-bars on opposite sides, and said bars having studs engaging the strap and said blinder, substantially as described.

2. The combination, with the strap, of the blinder and the buckle comprising the frame inclosing the strap and parts of the blinder, said frame having cross-bars on opposite sides, and said bars having studs engaging the strap and said blinder, and a brace-arm extending from the frame to the outer or middle part of the blinder, substantially as described.

3. A blinder-buckle, comprising the side bars 9 and 10, the end and middle bars 11 and 12 provided with inwardly-extending studs or lugs, the cross-bars 17 on the under side of said buckle and having inwardly-extending studs or lugs, and said side bar 10 upon either side of said middle bar being offset or inwardly curved, for the purpose set forth.

4. A blinder-buckle, comprising the side bars 9 and 10, the end and middle bars 11 and 12 provided with inwardly-extending studs or lugs, the cross-bars 17 on the under side of said buckle and having inwardly-extending lugs or pins, the laterally-extending arm carried by said side bar 10, and said arm being provided with prongs or lugs upon its outer end to engage the blinder, substantially as described.

In testimony whereof I have hereunto set my hand this 19th day of September, A. D. 1896.

JOHNSTON MEALEY.

In presence of—
RICHARD PAUL,
C. G. HAWLEY.